(12) United States Patent
Koerner

(10) Patent No.: US 6,851,454 B2
(45) Date of Patent: Feb. 8, 2005

(54) REINFORCING SUPPORT FOR PLASTIC PIPE

(75) Inventor: Dennis W. Koerner, Memphis, TN (US)

(73) Assignee: Ring Industrial Group, L.P., Oakland, TN (US)

( * ) Notice: Subject to any disclaimer, the term of this patent is extended or adjusted under 35 U.S.C. 154(b) by 0 days.

(21) Appl. No.: 10/360,743

(22) Filed: Feb. 10, 2003

(65) Prior Publication Data
US 2004/0089359 A1 May 13, 2004

Related U.S. Application Data

(63) Continuation-in-part of application No. 10/290,261, filed on Nov. 8, 2002.

(51) Int. Cl.[7] ................................................. F16L 1/00
(52) U.S. Cl. ..................... 138/105; 138/110; 138/106; 220/902; 206/443; 206/584; 206/523
(58) Field of Search .......................... 138/110, 99, 149, 138/129, 150, 105, 106; 206/503, 150, 443, 584; 220/902; 405/43, 45, 49, 50

(56) References Cited

U.S. PATENT DOCUMENTS

| | | | | |
|---|---|---|---|---|
| 3,732,662 A | * | 5/1973 | Paxton | 53/415 |
| 3,952,529 A | * | 4/1976 | Lefever | 405/157 |
| 3,965,686 A | * | 6/1976 | Saito et al. | 405/43 |
| 4,040,165 A | * | 8/1977 | Miessler et al. | 29/458 |
| 4,318,427 A | * | 3/1982 | Cross, Jr. | 138/149 |
| 4,880,119 A | * | 11/1989 | Simon | 206/584 |
| 4,881,846 A | * | 11/1989 | Burkstaller | 405/37 |
| 4,986,699 A | * | 1/1991 | Bohnhoff | 405/50 |
| 5,015,123 A | | 5/1991 | Houck et al. | |
| 5,639,364 A | * | 6/1997 | Houck et al. | 210/170 |
| 6,173,483 B1 | | 1/2001 | Houck et al. | |
| 6,267,882 B1 | * | 7/2001 | Houck et al. | 210/170 |
| 6,303,033 B1 | * | 10/2001 | Malone et al. | 210/282 |
| 6,443,652 B1 | * | 9/2002 | Houck et al. | 405/46 |

* cited by examiner

*Primary Examiner*—James Hook
(74) *Attorney, Agent, or Firm*—Sughrue Mion, PLLC

(57) ABSTRACT

The combination of a flexible pipe, e.g. plastic, and a reinforcing member mounted around the pipe to strengthen the pipe and to enhance its ability to resist deformation under load. In one embodiment the reinforcing member includes a flexible perforated plastic netting containing an aggregation of lightweight elements such as expanded polystyrene beads capable of wrapping around the pipe, preferably in helical fashion along the length of the pipe. In another embodiment, a number of members are mounted on the pipe in longitudinally extending fashion. In all embodiments, the beads provide drainage around the pipe when it is placed in a trench and obviate the need for gravel normally used in conventional systems. In another form of the invention, a drainage system is constructed by digging a trench, placing a reinforcing aggregate member in the corners at the bottom of the trench, and setting a large diameter cylindrical pipe in the trench. The aggregate members generally conform to and almost fill the open areas around the bottom of the pipe to support the pipe and prevent deformation thereof under load.

12 Claims, 4 Drawing Sheets

REINFORCING SUPPORT FOR PLASTIC PIPE

RELATED APPLICATIONS

This application is a continuation-in-part of application Ser. No. 10/290,261 filed on Nov. 8, 2002 and entitled "Reinforced Wrap For Plastic Pipe" the priority date of which is claimed herein.

BACKGROUND OF THE INVENTION

This invention relates generally to large diameter flexible pipe for example, plastic pipe, used in underground drainage systems and more particularly to a pipe having a reinforcing and strengthening preassembled drainage line member containing lightweight aggregate placed on the outside of the pipe to prevent deformation of the pipe under load and to resist deflection and provide impact resistance during shipping and handling of the pipe and placement of the pipe into a trench. Normally gravel is placed around the pipe in the trench. The lightweight aggregate replaces the gravel and enhances drainage around the pipe while providing structural support thereto.

In recent years thin walled, cylindrical plastic pipe constructed of high density polyethylene (HDPE) has been successfully substituted for prior concrete and metal pipe in constructing drainage systems for culverts, cross drains, storm sewers, land fills, and other public and private construction. The diameter of the larger pipes range from about 12 inches to 60 inches and are manufactured in about 20 foot lengths. Depending upon the application the pipes may be corrugated both internally and externally, corrugated externally with a smooth interior surface or provided with both smooth interior and exterior surfaces. The depth at which these pipes can be buried is from about 12 inch soil cover to as much as 60 foot soil cover.

These large diameter plastic pipes are subjected to various forces during transit from a manufacturing facility or a warehouse to a job site and while the pipe is being handled at the job site which tend to distort the pipe from its normal circular cross section. Although the pipe is reasonably rigid the forces may tend to flatten, bend or dent the pipe. Similarly, once the pipe is installed in the underground trench and the pipe is then covered with the backfill material, the weight of that material may deform the pipe from its normal circular cross section to an out of round condition. In addition, once in place and covered by gravel and fill, vehicles driving over the pipe, e.g. when the pipe is buried under a road, subject the pipe to substantial loads which tend to deform the pipe.

It would be advantageous to provide such large diameter flexible plastic pipe with a system which alleviates those deflection and deformation problems while facilitating drainage around the pipe and the invention as described hereinbelow was developed for that purpose.

SUMMARY OF THE INVENTION

Accordingly the primary object of this invention is to provide a simple, inexpensive reinforcing and drainage system which helps maintain the structural integrity of a large diameter flexible pipe, resists deflection and deformation of the pipe under load and replaces the gravel to provide for drainage around the pipe.

In one form, this object is accomplished by providing a reinforcing system comprising at least one preassembled drainage line member which includes an outer flexible perforated sleeve member, e.g. tubular nylon netting or mesh, filled with loose aggregate in the form of lightweight materials, for example, a plurality of crush resistant expanded polystyrene (EPS) beads tightly bound within the net, the member being secured on the outside surface of the pipe to strengthen the pipe and to provide drainage around the pipe when it is placed in a trench. A thin walled flexible plastic conduit may be provided within the member, with the lightweight materials surrounding the conduit and being bound thereby by the plastic netting.

In another form, the drainage system may be constructed by digging a trench of generally rectangular cross section, placing a preassembled drainage line member as described above in each of the corners at the bottom of the trench, and placing the cylindrical pipe within the trench so that the preassembled members almost fill the open area or haunch formed by the diverging side walls of the bottom of the pipe and the side walls and bottom of the trench. The flexible preassembled members generally conform to the configuration of the open area to almost fill the area and to provide reinforcement and load bearing support to the side walls of the pipe.

Similarly, when two pipes are to be placed side by side in a trench, a preassembled drainage line member may be positioned on the bottom of the trench so as to occupy and generally conform to the configuration of the open area or haunch formed by the diametral line of the pipes, the diverging side walls of the bottom of the pipes, and the bottom of the trench, thereby providing load bearing support to the adjacent side walls of both pipes.

As with the first embodiment, in this second embodiment the preassembled members also provide drainage around the pipe and alleviate the need for gravel, thereby reducing labor and material costs.

Further objects and advantages of the invention will become apparent from reading the following detailed description of the invention wherein reference is made to the accompanying drawings.

DETAILED DESCRIPTION OF THE INVENTION

Figure 1:
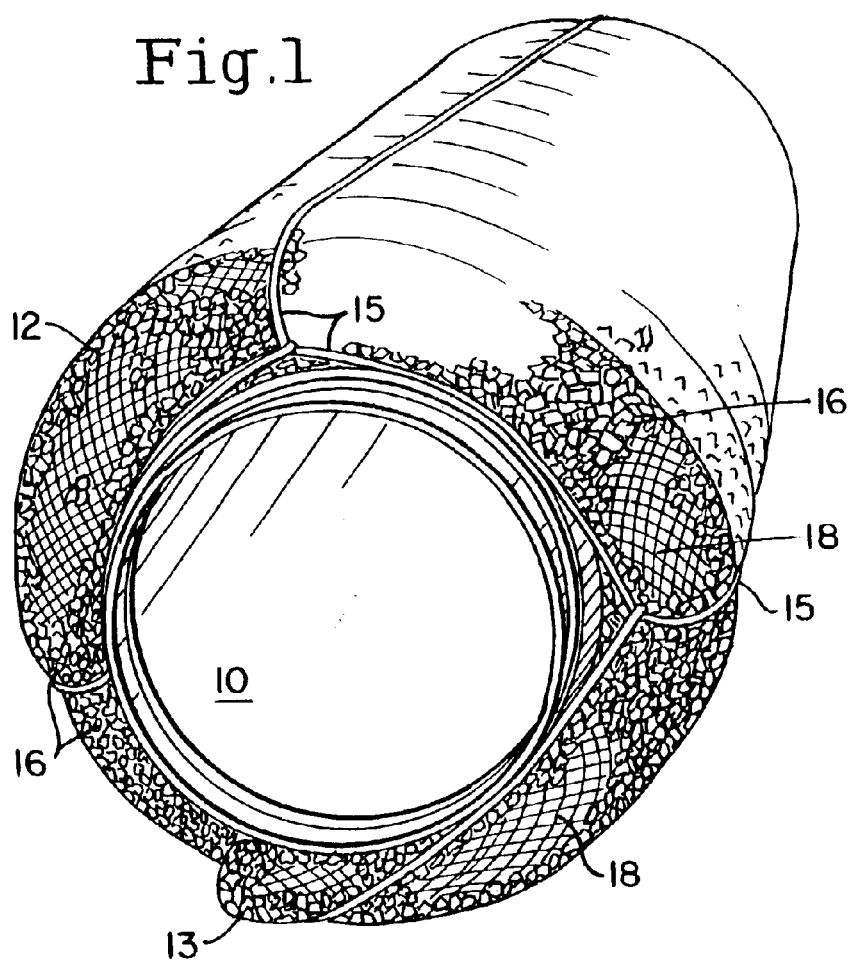
FIG. 1 is a generally perspective view illustrating a first embodiment of the invention in which a reinforcing member is wrapped helically along the length of a large diameter pipe to strengthen the pipe.
Figure 1A:
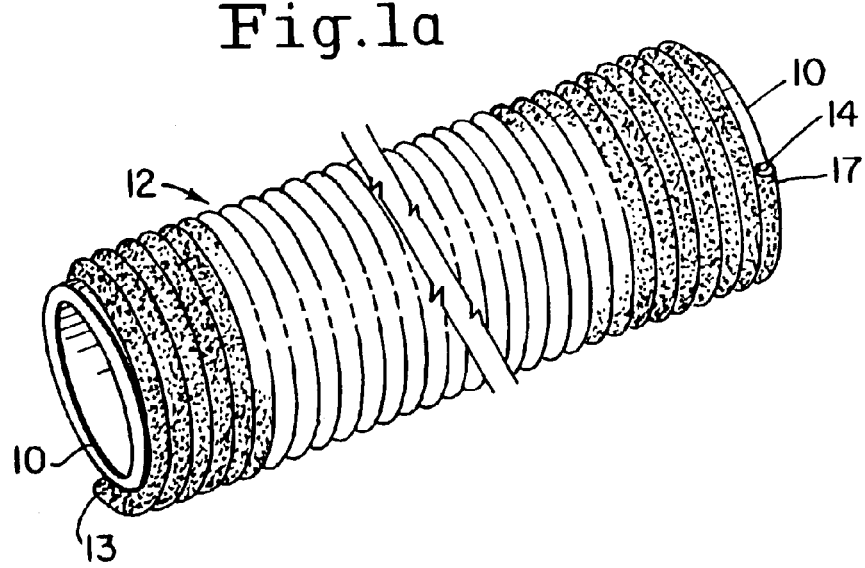
FIG. 1a is a schematic illustration of the embodiment of FIG. 1.

As illustrated in FIG. 1 and FIG. 1a, the first embodiment of the invention includes a large diameter plastic pipe 10 constructed for example from HDPE material having a predetermined length, for example about 20 feet, and a reinforcing, flexible, generally cylindrical preassembled drainage line member 12 tightly helically wound around the outside of pipe 10 from end to end of the pipe to strengthen the pipe and to enhance the ability of the pipe to resist deflection and deformation under load.

Figure 2:
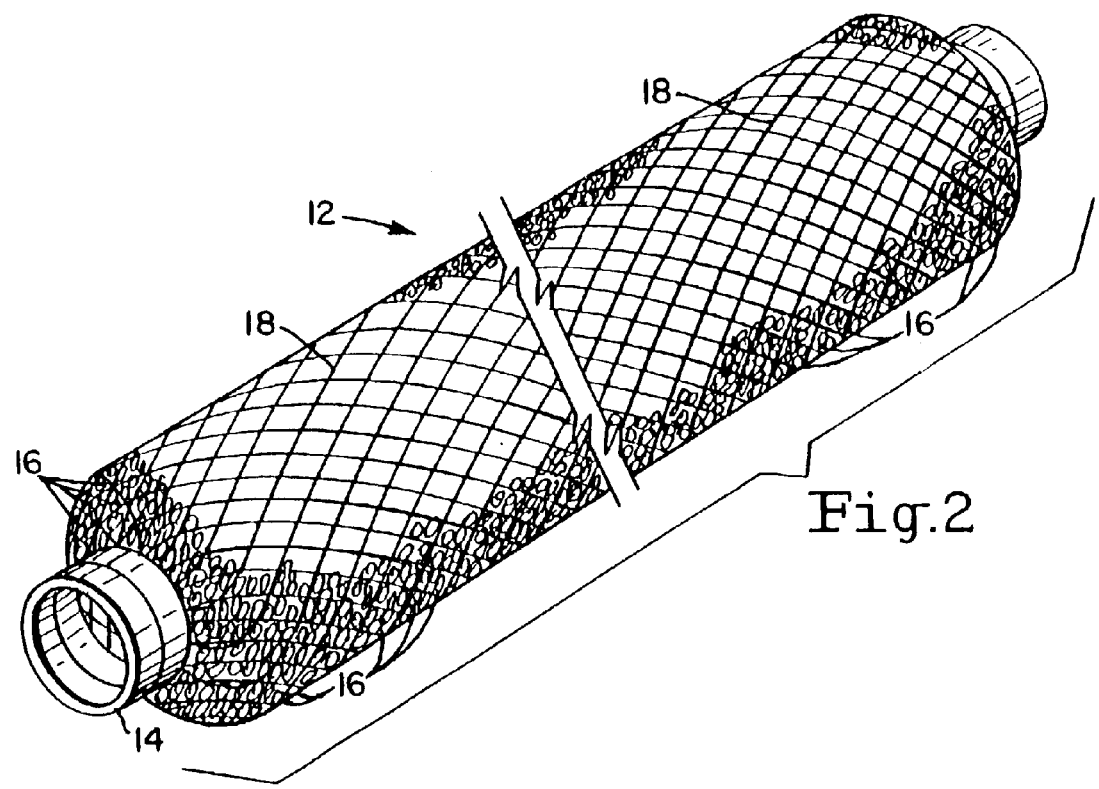
FIG. 2 is a perspective view of one form of the reinforcing member surrounding the pipe in FIG. 1.

Flexible reinforcing member 12 may be constructed as illustrated in FIG. 2 and includes a central flexible corrugated conduit 14 surrounded by a plurality of lightweight plastic aggregate 16 held in place by a surrounding plastic net or mesh 18 and suitably tied at its end to conduit 14. Member 12 can be manufactured to any desired length to accommodate any length and diameter of pipe 10.

Figure 3:
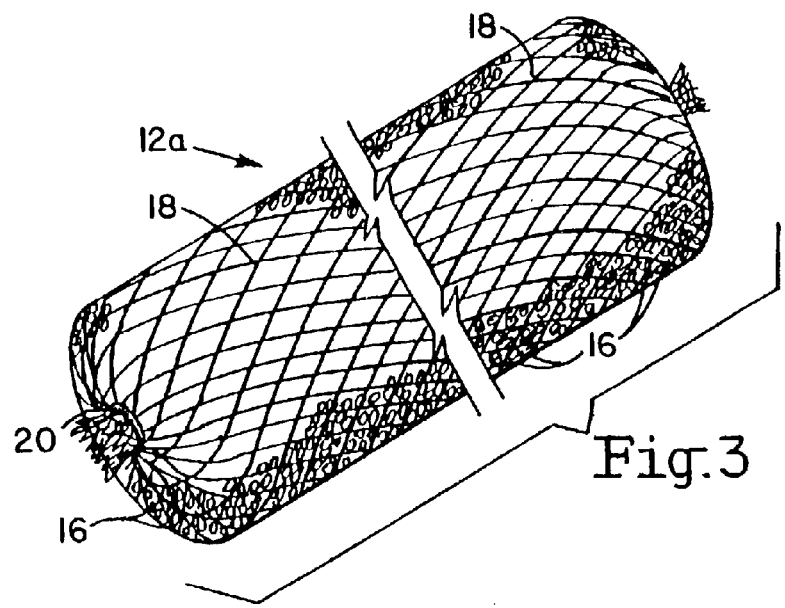
FIG. 3 is a perspective view of another form of the reinforcing member.

Alternative cylindrical member 12a illustrated in FIG. 3 is essentially identical to member 12 in FIG. 2 except that conduit 14 has been omitted and each end of net 18 is suitably tied by a fastener 20 to hold the aggregate 16 within. The outer diameter of members 12 and 12a can vary, e.g. between 3 inches and 36 inches depending on the diameter of the pipe 10 which can be as large as 6 feet or more.

The reinforcing aggregate units illustrated in FIGS. 2 and 3 are the same as those illustrated in FIGS. 2 and 3 of U.S. Pat. No. 5,015,123 which is owned by the same assignee of this invention. Those members can be manufactured by the method and apparatus described in the '123 patent or preferably by the method and apparatus illustrated in U.S. Pat. No. 6,173,483 which is also owned by the assignee of this application. The disclosures of the '123 patent and the '483 patent are incorporated herein by reference in their entirety.

The aggregate 16 are discrete water impervious, water resistant, crush resistant, lightweight plastic elements, preferably expanded polystyrene (EPS) beads of the type which are illustrated in U.S. Pat. No. 6,467,996 which is also owned by the assignee of this application. Beads 16 are firmly bound within net 18 but yet member 12 is flexible enough so that it may be tightly wrapped around pipe 10 in helical fashion, preferably with adjacent coils abutting each other. Each end of member 12 may include a generally cylindrical coil 13 at an end of pipe 10. Member 12 can be suitably fastened on pipe 10 e.g. by straps 15.

As mentioned above, the reinforcing wrap member 12 which is wound tightly around pipe 10 strengthens the pipe and enhances its ability to resist deflection, for example, bending, denting, or flattening of the pipe during handling and transportation and deformation under load when it is placed into the trench where it is subjected to the load of the backfill material which is placed on top thereof and forces caused by vehicles passing thereover. In addition, during transportation wherein a number of pipes are normally placed side by side and on top of each other on a flat bed, the reinforcing coil member 12 minimizes and cushions any impact between adjacent pipes 10 and thereby prevents any indentation or marring or other damage to the outside surface of the pipes and helps maintain the structural of integrity of the pipes.

The reinforcing aggregate members 12 are very light in weight, easy to handle, and add very little cost to the pipe itself while substantially increasing the strength of the pipe. In addition, when pipe 10 and member 12 attached thereon are placed in a trench, the EPS aggregate beads 16 provide drainage around the pipe and structurally support the pipe in use. Beads 16 replace gravel which has been used in prior conventional installations. As a result the invention reduces substantial labor and material costs in constructing drainage systems.

The member 12 may be quickly and easily attached to a pipe 10 following the manufacturing of the pipe by simply first attaching one end of member 12 to one end of pipe 10, slowly rotating pipe 10 while moving the remainder of the wrap linearly along the rotating pipe so as to wind the wrap in helical fashion around the pipe, and then finally attaching the other end of the wrap 17 around the other end of the pipe. Although it is preferable that adjacent coils abut each other, the pitch between adjacent coils of the wrap 12 can be varied by varying either the speed of rotation of pipe 10 or the speed of linear travel of the wrap along the pipe, or both.

Thus, it is clear that the invention of FIG. 1 accomplishes the objectives set forth initially hereinabove and provides a simple, inexpensive reinforcing and strengthening system for large diameter plastic pipes. While the reinforcing system is illustrated as constituting the helical wrap member 12, in some applications the system may include a plurality of separate cylindrical wrap members spaced along the length of pipe 10.

Figure 4:
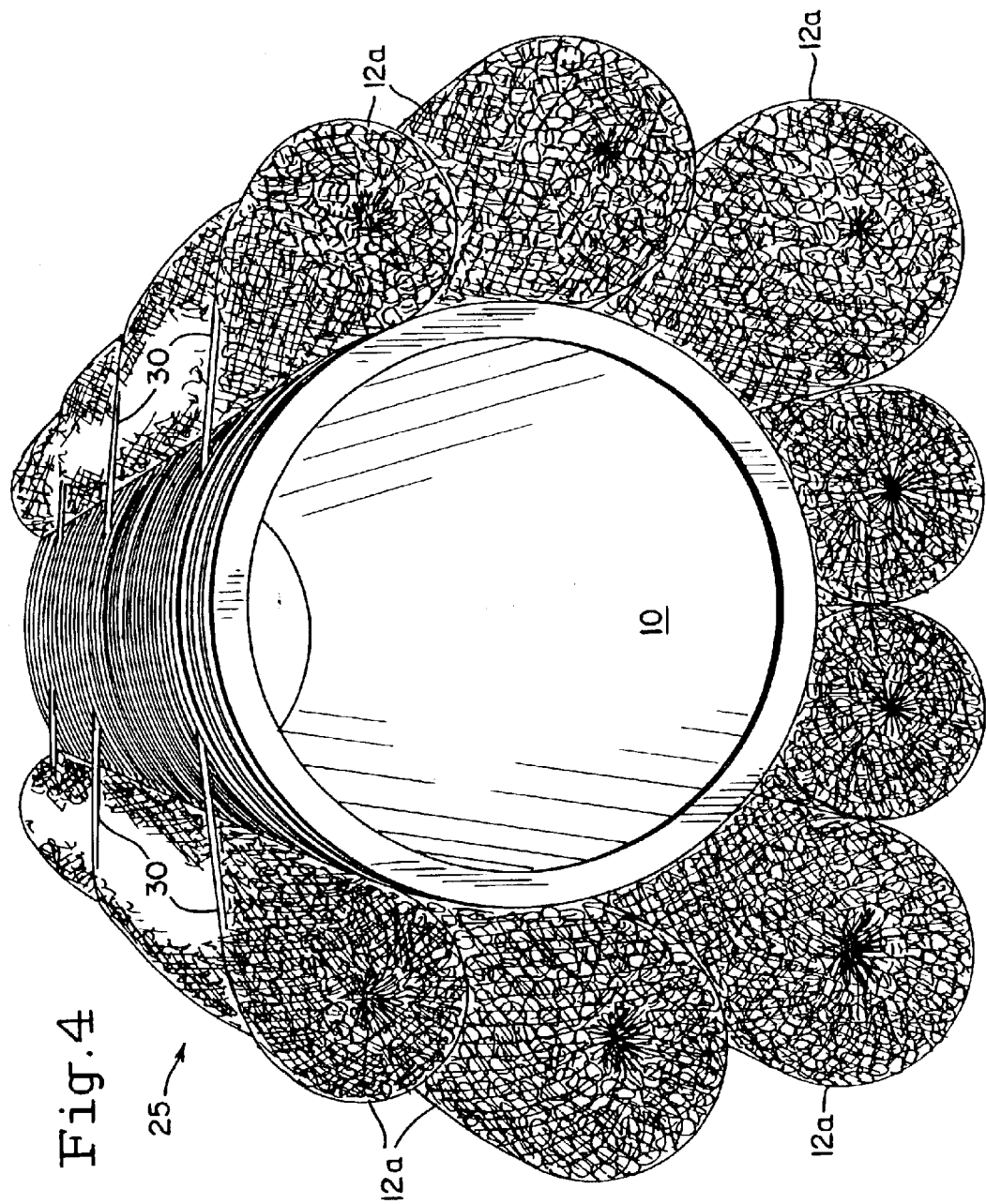
FIG. 4 is a generally perspective view of a second embodiment of the invention in which reinforcing members extend longitudinally on the outside surface of a pipe.

The second embodiment 25 of the invention illustrated in FIG. 4 includes a plurality of members 12 or 12a secured circumferentially around the outside of the pipe, each member extending longitudinally from one end of the pipe to the other. The members are secured to pipe 10 by straps 30 which wrap circumferentially around the members and the pipe.

As with the first embodiment of FIG. 1, the longitudinally extending members 12 or 12a of embodiment 25 strengthen the pipe. When the assembly is placed in a trench, the members containing beads 16 provide drainage around the pipe, replacing the gravel and thereby reducing labor and material costs.

The longitudinally extending members 12 in FIG. 4 may be selectively positioned around the circumference of pipe 10 to strengthen a weak area in a pipe installation. For example, when two pipes are placed side by side in a trench in abutting relationship, an open area or haunch 19 formed below the line of contact of the pipes, the diverging side walls of the bottom of the pipes, and the bottom of trench. This open area may weaken the pipe assembly which may deflect and deform under load. To avoid this, members 12 may be strategically positioned on one or both pipes to almost fill that open area and thereby provide full support for the pipes.

Figure 5:
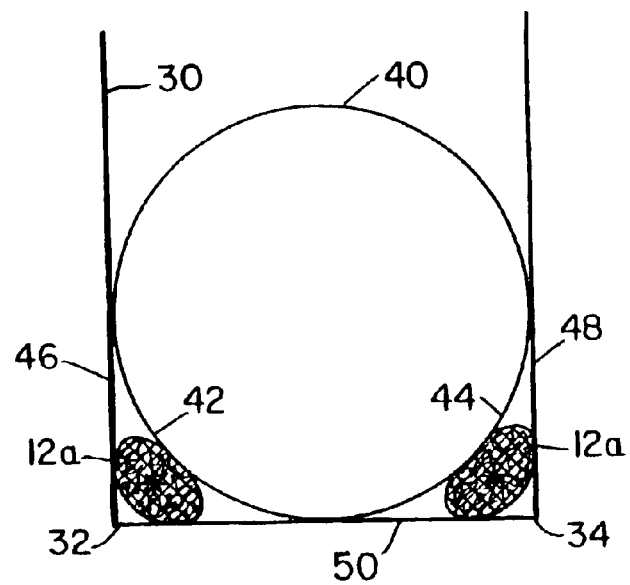
FIG. 5 is a schematic end view of a drainage system constructed by first placing reinforcing aggregate members in the corners at the bottom of a trench before setting the pipe therein.

Referring now to FIG. 5, instead of attaching the reinforcing aggregate members 12 or 12a to a pipe 10 prior to placement in a trench, a drainage system may be constructed by first digging a trench 30 of generally rectangular cross section and of a desired depth and width. Next one or more longitudinally extending preassembled aggregate members 12 or 12a are placed in each of the corners 32 and 34 at the bottom of trench 30. A large diameter plastic pipe 40 is then set in the trench resting against members 12 which, because they are flexible and because beads 16 are displaceable within net 18, generally conform to the configuration of the corner area or haunch defined by the diverging side walls 42 and 44 of the bottom of the pipe and the side walls 46 and 48, respectively, and bottom 50 of the trench 30. Members 12 almost fill those corner areas and afford load bearing support to pipe walls 42 and 44, thereby preventing deformation of pipe 40 under load after fill material is placed on top of the pipe to fill the trench.

Figure 6:
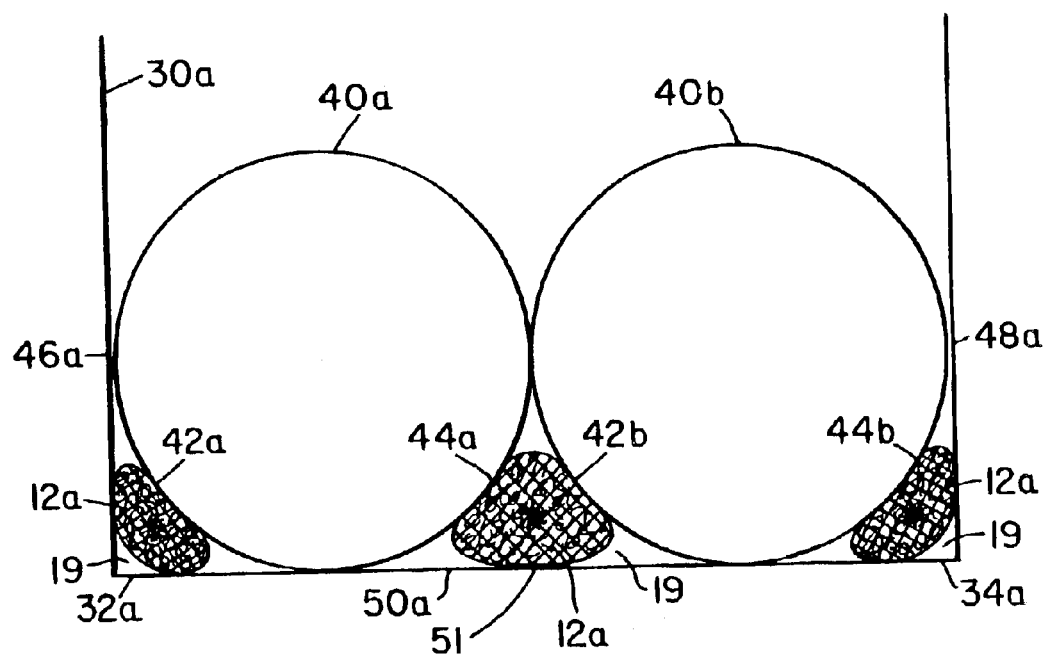
FIG. 6 is a schematic illustration similar to FIG. 5, but with at least two pipes set in the trench.

The drainage system of FIG. 6 is similar to FIG. 5, except that two large diameter pipes 40a and 40b are set side by side in a trench 30a. To construct the system, one or more longitudinally extending preassembled aggregate members 12 or 12a are placed in the corners 32a and 34a and on the center portion 51 of bottom 50a. Pipes 40a and 40b are then set in the trench resting side by side against members 12 in corners 32a and 34a, respectively, those members 12 generally conforming to the configuration of those corner areas and providing load bearing support to the adjacent pipe walls 42a and 44b as described with respect to FIG. 5.

In addition, pipes 40a and 40b rest on members 12 in the center portion 51 of bottom 50a, causing those central members 12 to generally conform to the area or haunch formed below the diametral line of the pipes, the diverging side walls 44a and 42b of the bottom of the pipes, and the bottom 50a of the trench. As in the corners, those central members 12 fill the open area in center portion 51 and provide load bearing support for pipe walls 44a and 42b.

In drainage systems such as those illustrated in FIGS. 5 and 6, using preassembled members 12 or 12a in place of conventional gravel significantly reduces labor and material costs, reduces installation and construction time, while at the same time providing load bearing support for the pipes which prevents deformation thereof.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A drainage system comprising a trench of desired length and width and including a pair of side walls spaced from each other and a bottom extending between said side walls to define a corner with each of said side walls; a flexible generally cylindrical preassembled drainage member positioned in and extending longitudinally along at least one of said corners of said trench, said preassembled drainage member including an outer perforated sleeve member and a loose aggregation of discrete, crush resistant, lightweight elements enveloped and bounded within said perforated sleeve member; a generally cylindrical pipe at least twelve inches in diameter resting on the bottom of said trench and engaging against said preassembled member, said member generally conforming to the configuration of the corner area defined by the respective side wall and bottom of the trench and the adjacent wall of the pipe to support the wall of the pipe and thereby prevent deformation thereof under load.

2. A drainage system as defined in claim 1, wherein another flexible preassembled drainage member is positioned within the other corner of said trench to support the wall of the pipe.

3. A drainage system as defined in claim 2, wherein at least two of said generally cylindrical pipes rest generally side-by-side on the bottom of said trench with an open area defined by adjacent diverging side walls of the pipes and the bottom of the trench, and at least one other preassembled member is positioned in the open area and generally conforms to the configuration of the open area to support the pipes and prevent deformation thereof under load.

4. A drainage system as defined in claim 1, said preassembled member further including a perforated conduit extending through said sleeve member and surrounded by said lightweight elements.

5. A drainage system comprising a trench of desired length and width and having a bottom, at least two generally cylindrical pipes at least twelve inches in diameter positioned generally side-by-side on said bottom with an open area defined by adjacent diverging side walls of said pipes and said bottom, and at least one flexible generally cylindrical preassembled drainage member positioned within and extending longitudinally along said open area, said preassembled drainage member including an outer perforated sleeve member and a loose aggregation of discrete, crush resistant, lightweight elements enveloped by and bounded within said perforated sleeve member, said preassembled drainage member generally conforming to the configuration of said open area to support said pipes and prevent deformation thereof under load.

6. A drainage system as defined in claim 5, said preassembled member further including a perforated conduit extending through said sleeve member and surrounded by said lightweight elements.

7. A method of constructing a drainage system comprising digging a trench of desired length and width and having a pair of side walls spaced from each other and a bottom extending between the side walls to define a corner with each of said side walls; placing a flexible generally cylindrical preassembled drainage member in and longitudinally extending along at least one of said corners, said preassembled drainage member including an outer perforated sleeve member and a loose aggregation of discrete, crush resistant, lightweight elements enveloped and bounded within said perforated sleeve member; and resting a generally cylindrical pipe of at least twelve inches in diameter on the bottom of said trench in engagement with said preassembled member which then generally conforms to the configuration of the corner area defined by the respective side wall and bottom of the trench and the adjacent wall of the pipe to support the wall of the pipe and thereby prevent deformation thereof under load.

8. The method of claim 7, comprising placing another preassembled drainage member in the other corner of the trench to support the wall of the pipe.

9. The method of claim 8, comprising placing at least two of said generally cylindrical pipes generally side-by-side in said trench with an open area defined by adjacent diverging side walls of the pipe and the bottom of the trench, and placing at least one other preassembled member in the open area the member generally conforming to the configuration of the open area to support the pipes and prevent deformation thereof under load.

10. A method of claim 7, said preassembled member further including a perforated conduit extending through said sleeve member and surrounded by said lightweight elements.

11. A method of constructing a drainage system comprising digging a trench of desired length and width and having a bottom; placing at least one longitudinally extending flexible generally cylindrical preassembled drainage member on said bottom, the preassembled drainage member including an outer perforated sleeve member and a loose aggregation of discrete, crush resistant, lightweight elements enveloped and bounded within said perforated sleeve member; and placing two generally cylindrical pipes of at least twelve inches in diameter generally side-by-side on said bottom with the side walls of the bottom of the pipes overlying and engaging the preassembled drainage member so that the member generally conforms to the configuration of the area between the side walls of the pipes and the bottom of the trench to support the pipes and prevent deformation thereof under load.

12. A drainage system as defined in claim 11, said preassembled member further including a perforated conduit extending through said sleeve member and surrounded by said lightweight elements.

* * * * *